United States Patent
Steckel et al.

(10) Patent No.: US 11,979,521 B2
(45) Date of Patent: May 7, 2024

(54) DATA STREAM BASED EVENT SEQUENCE ANOMALY DETECTION FOR MOBILITY CUSTOMER FRAUD ANALYSIS

(71) Applicant: AT&T Intellectual Property I, L.P., Atlanta, GA (US)

(72) Inventors: Ryan Steckel, Little Elm, TX (US); Ana Armenta, San Jose, CA (US); Prince Paulraj, Coppell, TX (US); Chih Chien Huang, Mountain View, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 426 days.

(21) Appl. No.: 17/321,279

(22) Filed: May 14, 2021

(65) Prior Publication Data
US 2022/0366430 A1    Nov. 17, 2022

(51) Int. Cl.
*H04M 7/00* (2006.01)
*H04L 51/21* (2022.01)
*H04M 3/22* (2006.01)
*G06Q 20/40* (2012.01)

(52) U.S. Cl.
CPC .......... *H04M 7/0078* (2013.01); *H04L 51/21* (2022.05); *H04M 3/22* (2013.01); *G06Q 20/4016* (2013.01)

(58) Field of Classification Search
None
See application file for complete search history.

(56) References Cited

U.S. PATENT DOCUMENTS

| | | | |
|---|---|---|---|
| 2003/0147516 A1* | 8/2003 | Lawyer | H04M 15/58 379/114.14 |
| 2014/0226799 A1* | 8/2014 | Aggarwal | H04L 41/5096 379/32.01 |
| 2017/0374076 A1* | 12/2017 | Pierson | H04L 63/08 |
| 2018/0005315 A1* | 1/2018 | Rines | G06Q 40/02 |
| 2020/0244511 A1* | 7/2020 | Rinzler | H04L 63/1466 |
| 2021/0319448 A1* | 10/2021 | Goodsitt | G06Q 20/405 |
| 2022/0101192 A1* | 3/2022 | Patel | G06N 7/01 |

* cited by examiner

*Primary Examiner* — Quoc D Tran
(74) *Attorney, Agent, or Firm* — Guntin & Gust, PLC; Kenneth S. Kwan

(57) ABSTRACT

Data stream based event sequence anomaly detection for mobility customer fraud analysis is presented herein. A system obtains a sequence of events comprising respective modalities of communication that correspond to a subscriber identity associated with a communication service—the sequence of events having occurred within a defined period. Based on defined classifiers representing respective fraudulent sequences of events, the system determines, via a group of machine learning models corresponding to respective machine learning processes, whether the sequence of events satisfies a defined condition with respect to likelihood of representing a fraudulent sequence of events of the respective fraudulent sequences of events. In response to the sequence of events being determined to satisfy the defined condition, the system sends, via a user interface of the system, a notification indicating that the sequence of events has been determined to represent the fraudulent sequence of events.

20 Claims, 10 Drawing Sheets

DATA STREAM BASED EVENT SEQUENCE ANOMALY DETECTION FOR MOBILITY CUSTOMER FRAUD ANALYSIS

TECHNICAL FIELD

The subject disclosure generally relates to embodiments for data stream based event sequence anomaly detection for mobility customer fraud analysis.

BACKGROUND

Identifying telecommunication based fraud involves post-hoc, manual review of data across multiple systems. For example, an analyst might open three or more different user interfaces to review events. As such events often have different formatting, timing and nomenclatures, attempting to correlate timings and other information between the events is time consuming and error prone. Further, since fraud related schemes often change very quickly, attempts to represent examples of such fraud can become moot weeks after their discovery. Accordingly, supervised models that rely on aged fraud labels will not be effective to catch new fraud schemes. Consequently, conventional telecommunication fraud detection technologies have had some drawbacks, some of which are noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
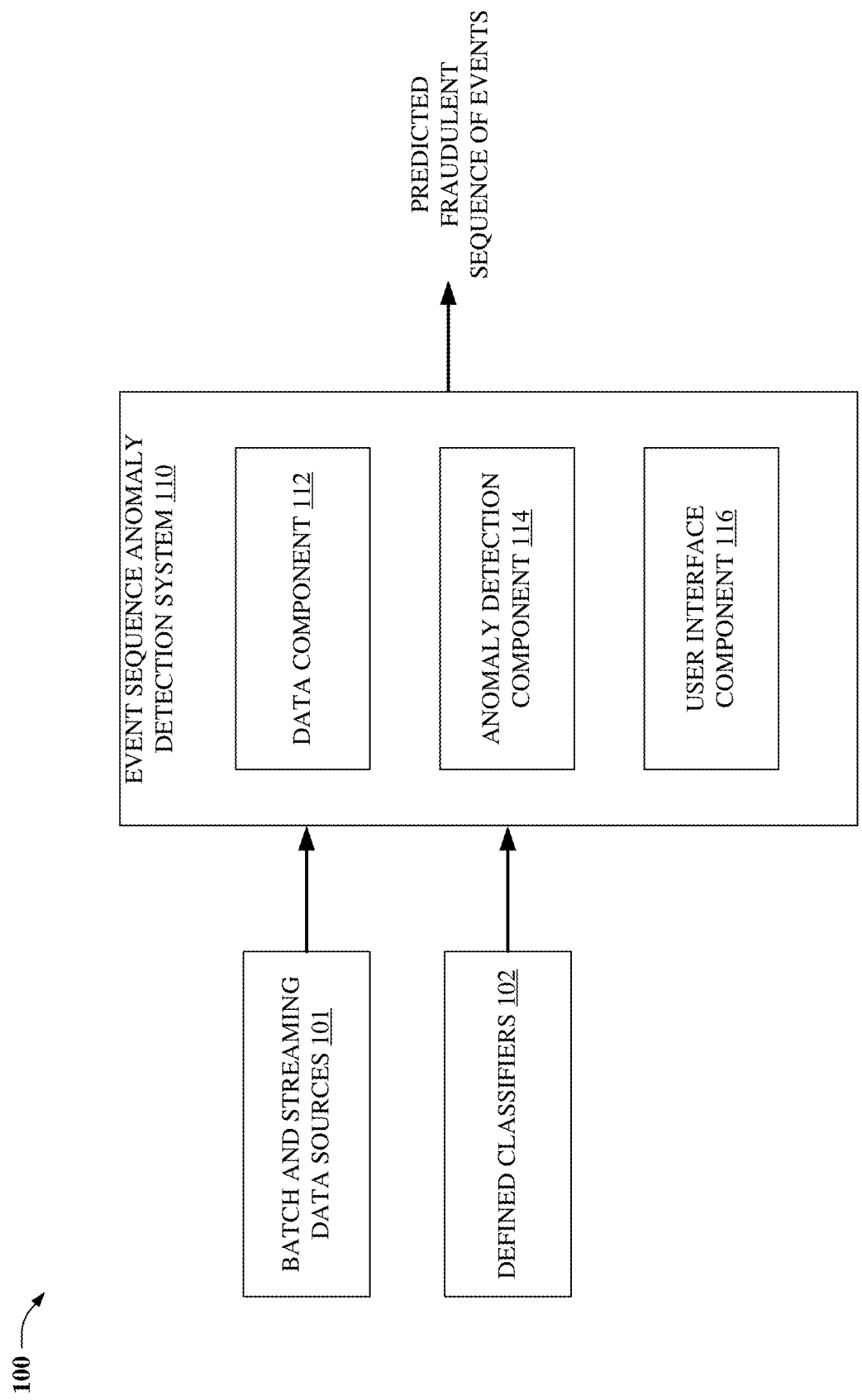
FIG. 1 illustrates a block diagram of a communication environment including an event sequence anomaly detection system for facilitating data stream based event sequence anomaly detection for mobility customer fraud analysis, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional telecommunication fraud detection technologies have had some drawbacks with respect to correlating timings and other information between events representing fraudulent activity. On the other hand, various embodiments disclosed herein can facilitate improved fraudulent event detection, e.g., in a multi-modal communication environment utilizing, e.g., Internet, text, telephonic, sales, and other types of communication channels, based on automated analysis and detection of fraudulent sequences of communication events combined with a semi-supervised machine learning platform.

For example, in embodiment(s), a system, e.g., an event sequence anomaly detection system, comprises a processor and a memory that stores executable instructions that, when executed by the processor, facilitate performance of operations by the processor—the operations comprising: obtaining a sequence of events comprising respective modalities of communication that correspond to a subscriber identity associated with a communication service, in which the sequence of events have a occurred within a defined period; based on defined classifiers representing respective fraudulent sequences of events, determining, via a group of machine learning models corresponding to respective machine learning processes, whether the sequence of events satisfies a defined condition with respect to likelihood of representing a fraudulent sequence of events of the respective fraudulent sequences of events; and in response to the sequence of events being determined to satisfy the defined condition with respect to the likelihood of representing the fraudulent sequence of events, sending, via a user interface of the system, a notification indicating that the sequence of events has been determined to represent the fraudulent sequence of events.

In an embodiment, an event of the sequence of events comprises: an on-line event representing an interaction with the sales-channel communication interface corresponding to the communication service provider, a purchase event representing a purchase, associated with the subscriber identity via the sales-channel communication interface corresponding to the communication service provider, of at least one of a product or a service, a password reset event representing a request to reset a password of an account associated with the subscriber identity, or a call event representing that the call has been initiated.

In one embodiment, the respective modalities of communication comprise an Internet-based communication, a call corresponding to a phone number of a communication device associated with the subscriber identity, a short message service message that has been directed to the communication device associated with the subscriber identity, and/or a sales-channel communication interface corresponding to a communication service provider that enables the communication service. In this regard, the sales-channel communication interface includes online, retail, customer care, and other types of sales communication interfaces in which a transaction for a service is occurring between a subscriber/customer and a service provider.

In another embodiment, the sequence of events comprises a triggering event, and the sending of the notification indicating that the sequence of events has been determined to represent the fraudulent sequence of events comprises: displaying, via the user interface, the sequence of events via a timeline representing respective times when the events occurred with respect to the triggering event.

In yet another embodiment, the triggering event comprises a purchase, associated with the subscriber identity via a sales-channel communication interface corresponding to a communication service provider identity associated with the communication service, of a product, and wherein remaining events of the sequence of events precede the triggering event.

In an embodiment, the events of the sequence of events have been annotated with respective metadata representing contextual information of the events—the contextual information representing respective contexts of the respective modalities of communication. In this regard, a context of the respective contexts of a modality of communication of the respective modalities of communication comprises: a defined phone number, a defined area code of the phone number, a defined toll-free phone number, a defined spoofed phone number, a relationship of a first event of the sequence of events that occurred within the defined period to a second event of the sequence of events that occurred within the defined period, a temporary password corresponding to a subscriber account associated with the subscriber identity, a temporary personal identification number (PIN) corresponding to the account associated with the subscriber identity, or respective times that the events occurred.

In one embodiment, the determining whether the sequence of events satisfies the defined condition with respect to the likelihood of representing the fraudulent sequence of events comprises: based on the respective metadata, determining whether the contextual information of the events is representative of a defined classifier, of the defined classifiers, representing the fraudulent sequence of events.

In another embodiment, the operations further comprise: assigning an anomaly score (e.g., from 1.0 to 10.0) to the sequence of events representing a determined probability of an occurrence of the sequence of events—the defined condition corresponding to a defined threshold probability (e.g., corresponding to a defined anomaly score, e.g., 4.1) representing that the sequence of events is uncommon; and prior to sending the notification, confirming that the determined probability of the occurrence of the sequence of events is at most the defined threshold probability (e.g., less than or equal to the defined anomaly score, in which a lowest score of 1.0 represents a lowest defined threshold probability representing that a most uncommon sequence of events has been determined to have occurred, and in which a highest score of 10.0 representing a highest defined threshold probability representing that a most common sequence of events has been determined to have occurred.

In yet another embodiment, the sequence of events is a fraudulent sequence of events candidate, and the operations further comprise: in response to receiving, via the user interface, a confirmation that the respective fraudulent sequences of events are to comprise the fraudulent sequence of events candidate, generating a defined classifier of the defined classifiers comprising metadata representing contextual information of the events—the contextual information representing contexts of the respective modalities of communication—and assigning the defined classifier to the fraudulent sequence of events candidate. In this regard, the assigning of the defined classifier indicates that the respective fraudulent sequences of events comprises the fraudulent sequence of events candidate.

In an embodiment, the group of machine learning models comprises a supervised machine learning model, an unsupervised machine learning model, a semi-supervised machine learning model, a deterministic rule-based machine learning model, a probabilistic-based machine learning model, and/or a deep learning model.

In one embodiment, a method, comprises: obtaining, by a system (e.g., an event sequence anomaly detection system) comprising a processor, data streams comprising respective sequences of communication events corresponding to distinct communication channels associated with a communication service provider identity; in response to selecting, by the system from the respective sequences of communication events, a selected sequence of communication events comprising a triggering event of the respective sequences of communication events and other events of the respective sequences of communication events, other than the triggering event, that have occurred within a defined period of the triggering event, determining, by the system based on defined classifiers via a group of machine learning models corresponding to respective machine learning processes, whether the selected sequence of communication events satisfies a defined criterion with respect to representing a fraudulent sequence of communication events.

In turn, the method further comprises: in response to the selected sequence of communication events being determined to satisfy the defined criterion with respect to representing the fraudulent sequence of communication events, sending, by the system via a user interface of the system, a message comprising notifying information that the selected sequence of communication events has been determined to represent the fraudulent sequence of communication events.

In another embodiment, the triggering event comprises: an on-line event representing an interaction with a communication interface corresponding to the communication service provider identity, a purchase event representing a purchase, via the communication interface and associated with a subscriber identity corresponding to a subscription service associated with the communication service provider identity, of a service, a password reset event representing a request to reset a password of an account associated with the subscriber identity, or a call event representing that a call corresponding to a mobile device associated with the subscriber identity has been initiated.

In yet another embodiment, the other events of the respective sequences of communication events, other than the triggering event, that have occurred within the defined period of the triggering event comprise: a messaging event representing that a short message service message has been directed to the mobile device associated with the subscriber identity, the on-line event, the purchase event, the password reset event, and/or the call event.

In an embodiment, the method further comprises: displaying, by the system via the user interface, the triggering event and the other events via a timeline representing respective times when the other events have occurred with respect to the triggering event.

In one embodiment, the determining whether the selected sequence of communication events satisfies the defined criterion comprises: determining, via the group of machine learning models, a probability of an occurrence of the selected sequence of communication events; based on the probability, assigning an anomaly score to the selected sequence of communication events; and based on the anomaly score being determined to be less than a defined anomaly score indicating that a first defined probability representing an anomalistic occurrence of communication events is less than a second defined probability representing a non-anomalistic occurrence of communication events corresponding to a defined non-anomaly score, determining that the selected sequence of communication events satisfies the defined criterion with respect to representing the fraudulent sequence of communication events. In this regard, the sending of the message further comprises displaying, via the user interface, the anomaly score.

In another embodiment, the selecting of the selected sequence of communication events comprises: receiving a selection of the triggering event; and based on the selection of the triggering event and the defined period, obtaining, via the group of machine learning models, the other events of the respective sequences of communication events.

In yet another embodiment, the receiving of the selection comprises: determining, via the group of machine learning models, the selection of the triggering event, or receiving, via the user interface, the selection of the triggering event. In this regard, the selection has been selected from a group of selectable triggering events comprising an on-line event representing an interaction with a communication interface corresponding to the communication service provider identity, a purchase event representing a purchase, via the communication interface and associated with a subscriber identity corresponding to the communication service provider identity, of at least one of a product or a service, a password reset event representing a request to reset a password of an account associated with the subscriber identity, a call event representing that a call corresponding to a mobile device associated with the subscriber identity has been initiated, or a messaging event representing that a short message service message has been directed to the mobile device associated with the subscriber identity.

In an embodiment, the method further comprises: annotating, by the system, the respective sequences of communication events with metadata representing contexts of the distinct communication channels, in which the contexts comprise a defined phone number, a defined area code of the phone number, a defined toll-free phone number, a defined spoofed phone number, a relationship of a first event, of the respective sequences of communication events that have occurred within the defined period, to a second event of the respective sequences of communication events, a temporary password corresponding to the account associated with the subscriber identity, a temporary PIN corresponding to the account associated with the subscriber identity, and/or respective times that the communication events occurred.

In one embodiment, a non-transitory machine-readable medium comprises executable instructions that, when executed by a system (e.g., an event sequence anomaly detection system) comprising a processor, facilitate performance of operations, comprising: in response to obtaining, from data streams, respective sequences of communication events corresponding to communication channels and based on defined classifiers via a group of machine learning models corresponding to respective machine learning processes, determining whether a sequence of communication events of the respective sequences of communication events satisfies a defined condition representative of the sequence of communication events being a fraudulent sequence of communication events candidate—the fraudulent sequence of communication events comprising a triggering event of the sequence of communication events and remaining events of the sequence of communication events that have occurred within a defined period from the triggering event.

Further, the operations comprise: in response to determining that the sequence of communication events satisfies the defined condition representative of the sequence of communication events being the fraudulent sequence of communication events candidate, sending, via a user interface of the system, a notification representative of the sequence of communication events having been determined to be the fraudulent sequence of communication events candidate.

In another embodiment, sending of the notification comprises: displaying, based on the defined period via the user interface, the triggering event and the remaining events via a timeline representing respective times corresponding to when the remaining events occurred with respect to the triggering event.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As described above, conventional techniques for correlating the timing of, and information corresponding to, respective communication events for identifying a fraudulent series of events, e.g., a series of actions being performed to prepare for, e.g., mobility account takeover fraud, is time consuming and error prone. Further, since fraud related schemes often change very quickly, attempts to represent examples of such fraud can become moot weeks after their discovery.

Figure 2:
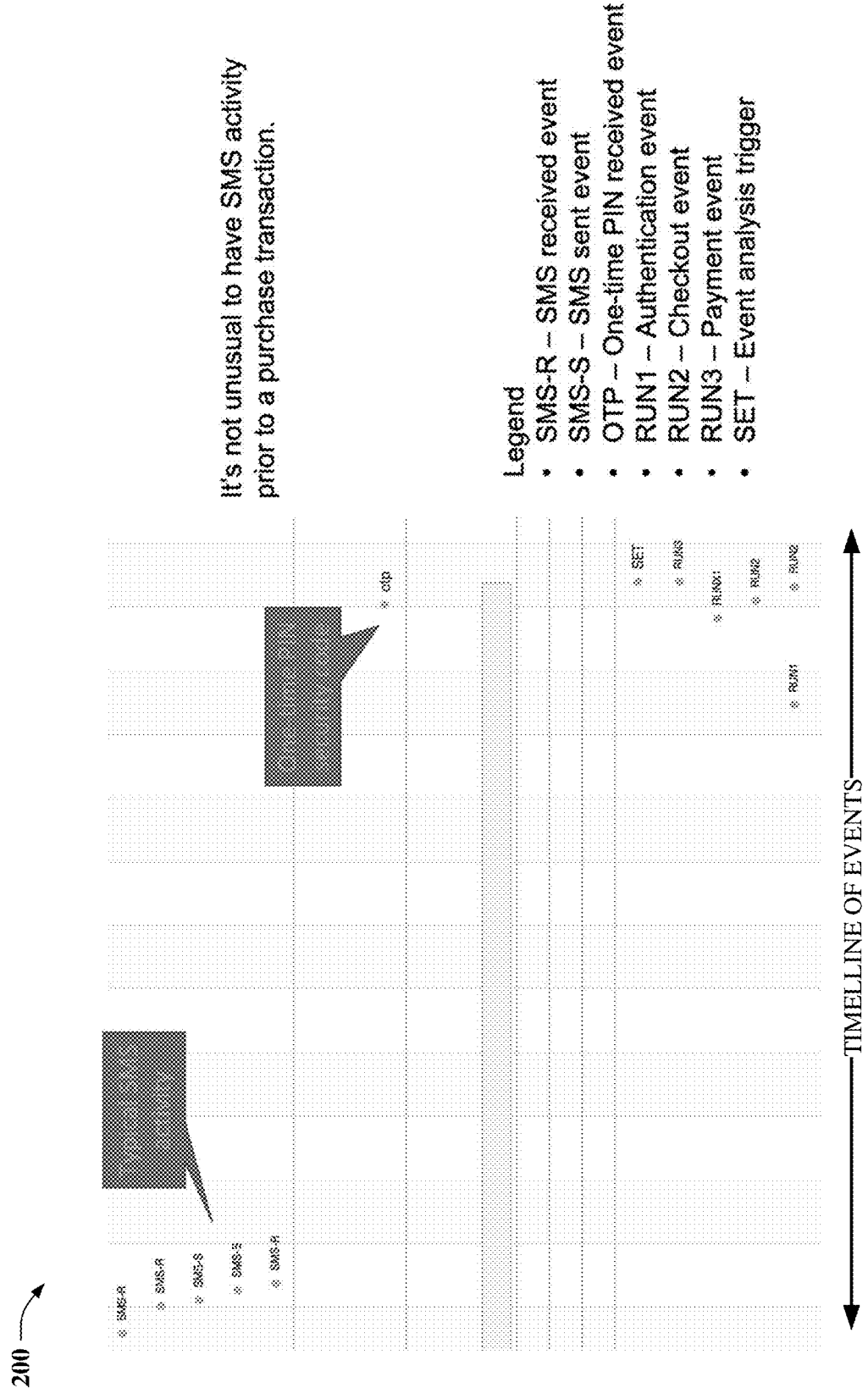
FIG. 2 illustrates a typical sequence of events, e.g., corresponding to a high probability of occurrence of events, which have occurred within a communication environment corresponding to an event sequence anomaly detection system, in accordance with various example embodiments.
Figure 3:
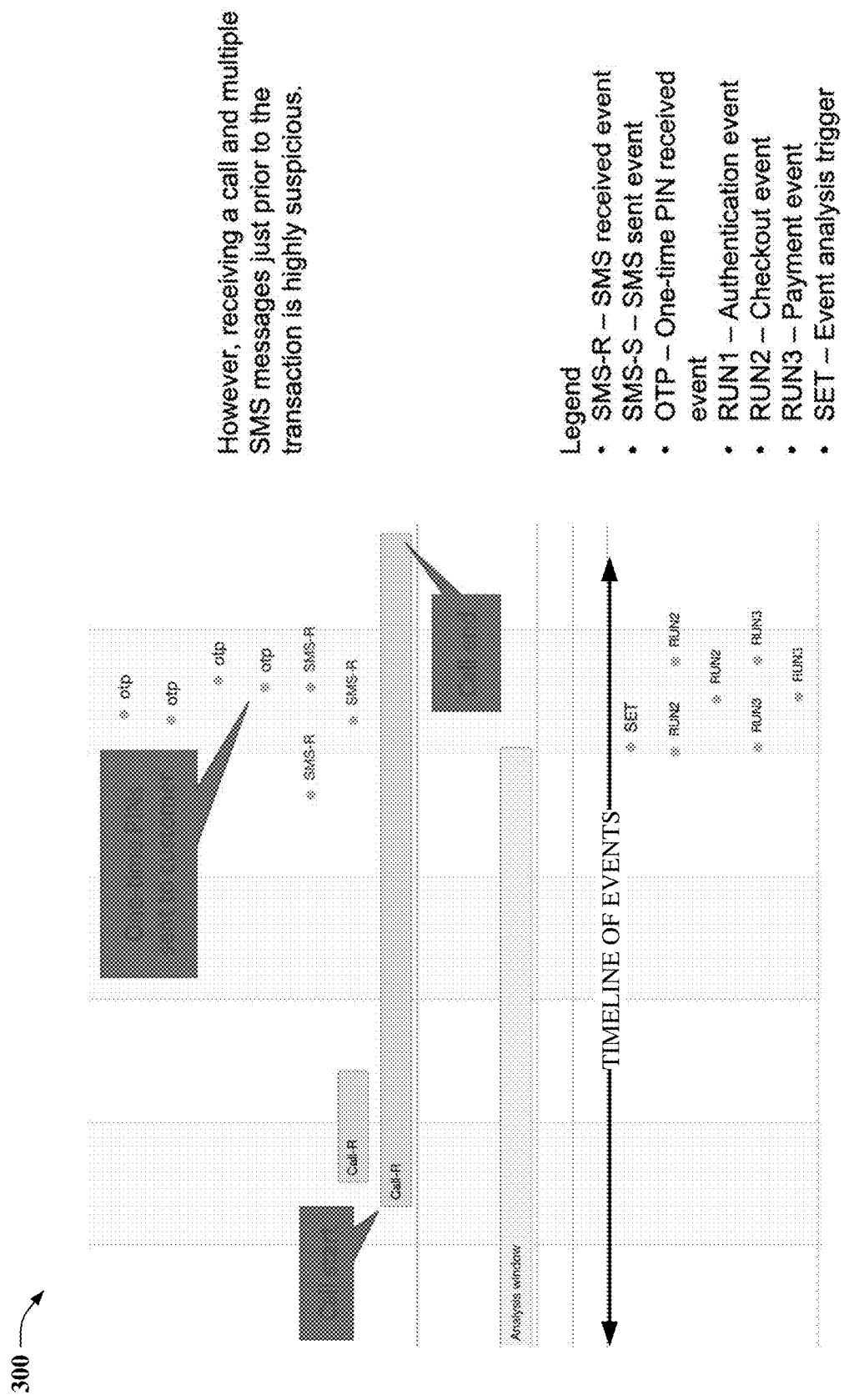
FIG. 3 illustrates an anomalous sequence of events, e.g., corresponding to a low probability of occurrence of events, which have occurred within a communication environment corresponding to an event sequence anomaly detection system, in accordance with various example embodiments.

Referring now to FIGS. 2 and 3, a typical sequence of events, e.g., corresponding to a high probability of occurrence, and an anomalous sequence of events, e.g., corresponding to a low probability of occurrence, are illustrated, respectively, in accordance with various example embodiments. As illustrated by FIG. 2, it is not unusual or uncommon to have a short message service (SMS) message being received, by a subscriber of a subscription service associated with a communication service provider, prior to a purchase transaction by the subscriber, e.g., the subscriber receiving, via a mobile device associated with the subscriber, an SMS message including a one-time personal identification number (PIN). On the other hand, as illustrated by FIG. 3., it is highly suspicious to have the subscriber receive, via the mobile device, multiple SMS messages just prior to the purchase transaction, e.g., the multiple SMS messages including respective one-time PINs.

In this regard, and now referring to FIG. 1, in various embodiments described herein, an event sequence anomaly detection system (110) can facilitate improved fraudulent event detection, e.g., in a multi-modal communication environment utilizing, e.g., internet, text, telephonic, consumer-based, and other types of communication channels, based on automated analysis and detection of fraudulent sequences of communication events combined with a semi-supervised machine learning.

The event sequence anomaly detection system includes a data component (112), an anomaly detection component (114), and a user interface component (116). The data component obtains, via batch and streaming data sources 101 (e.g., including data sources corresponding to a communication service provider, wireless service provider, third-party data sources, and other data sources), a sequence of events corresponding to respective modalities of communication that correspond to a subscriber identity associated with a communication service provider—the sequence of events having been determined to have occurred within a defined period or timeline.

In embodiment(s), the respective modalities of communication include an Internet-based communication, a call corresponding to a phone number of a communication device, e.g., mobile device, associated with the subscriber identity, an SMS message that has been directed to the communication device associated with the subscriber identity, and/or a sales-channel communication interface corresponding to a communication service provider that enables the communication service. In this regard, the sales-channel communication interface includes online, retail, customer care, and other types of sales communication interfaces in which a transaction for a service is occurring between a subscriber/customer and a service provider In other embodiment(s), an event of the sequence of events includes an on-line event representing an interaction with the sales-channel communication interface corresponding to the communication service provider, a purchase event representing a purchase, associated with the subscriber identity via the sales-channel communication interface corresponding to the communication service provider, of a product and/or a service, a password reset event representing a request to reset a password of an account associated with the subscriber identity, or a call event representing that the call has been initiated.

Figure 4:
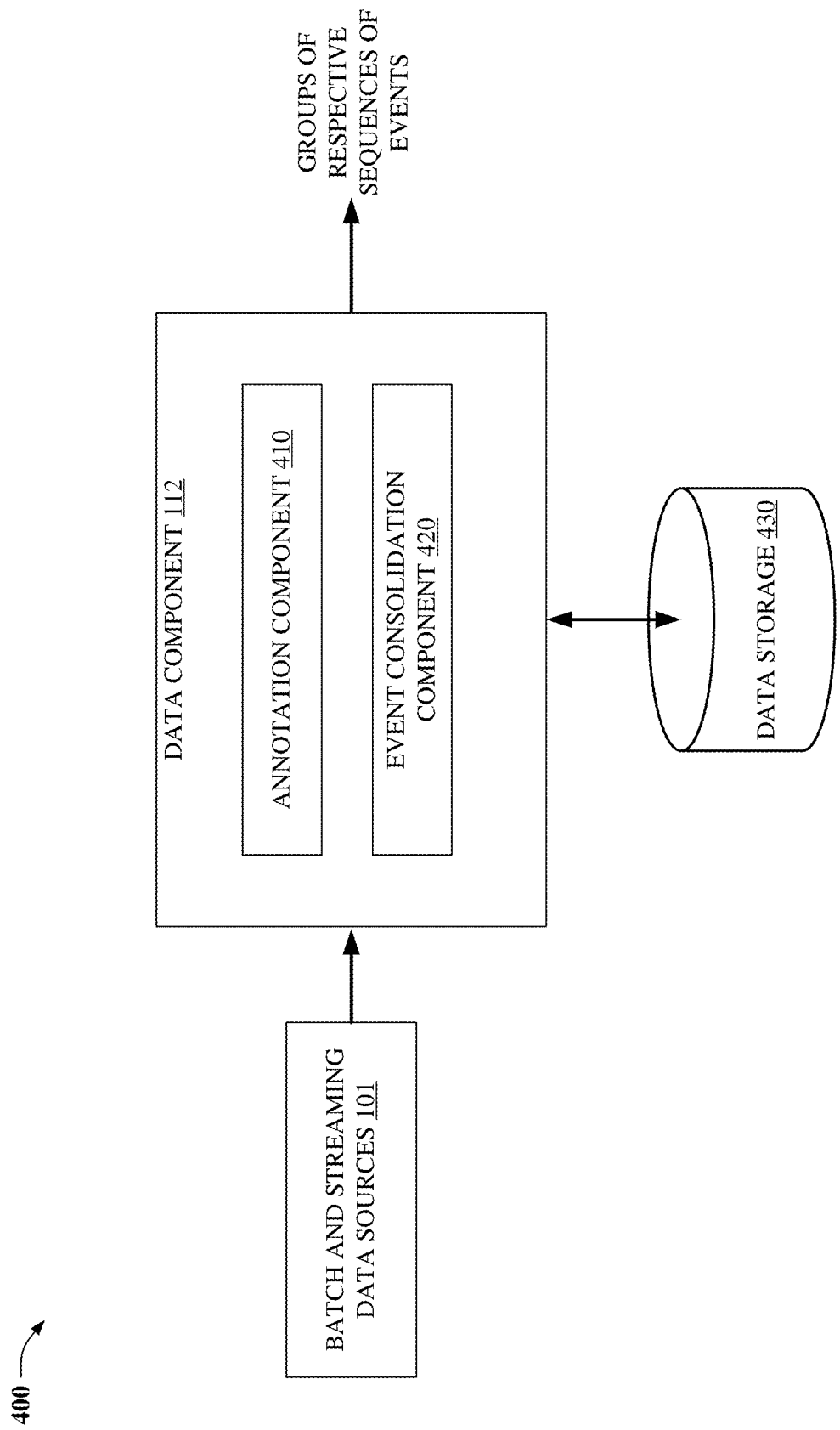
FIG. 4 illustrates a block diagram of a communication environment including a data component and corresponding data storage of an event sequence anomaly detection system for facilitating data stream based event sequence anomaly detection for mobility customer fraud analysis, in accordance with various example embodiments.

Referring now to FIG. 4, the data component can include an annotation component (410) and an event consolidation component (420). The annotation component annotates the events of the sequence of events with respective metadata representing contextual information, e.g., attributes, of the events—the contextual information representing respective contexts of the respective modalities of communication. In this regard, a context of the respective contexts of a modality of communication of the respective modalities of communication includes a defined phone number, a defined area code of the phone number, a defined toll-free phone number, a defined spoofed phone number, a relationship of a first event of the sequence of events that occurred within the defined period to a second event of the sequence of events that occurred within the defined period, a temporary password corresponding to a subscriber account associated with the subscriber identity, a temporary PIN corresponding to the account associated with the subscriber identity, or respective times that the events occurred.

In embodiment(s), the contextual information, e.g., attributes, of the events includes: a start date and time of the event, e.g., a start timestamp; an end date and time of the event, e.g., an end timestamp; an event type of the event, e.g., call, order, email, or other type of communication event; a direction of the event, e.g., representing whether the subscriber initiated the event or whether the event was received and/or directed to the subscriber (e.g., a phone call, SMS message, etc. that was directed to the subscriber being determined, by the anomaly detection component, to correspond to an undesired and/or fraudulent communication); or a type of communication of the event, e.g., representing whether the event corresponds to a business entity, an account of the subscriber, or another account corresponding to a person associated with the subscriber, e.g., a relative, a neighbor, or other type of relationship to the subscriber.

In turn, the event consolidation component can group, e.g., based on the contextual information of the events representing the contexts of the respective modalities of communication, the events into groups of respective sequences of events corresponding to respective defined periods of time during which the events have occurred. In this regard, a group of the groups comprises the sequence of events that have been determined to have occurred within the defined period, and the group is represented by other contextual information.

In embodiment(s), the data component stores the annotated events, e.g., corresponding to the batch and data streaming sources, and stores the group comprising the sequence of the events and the other contextual information representing the group in data storage 430.

Figure 5:
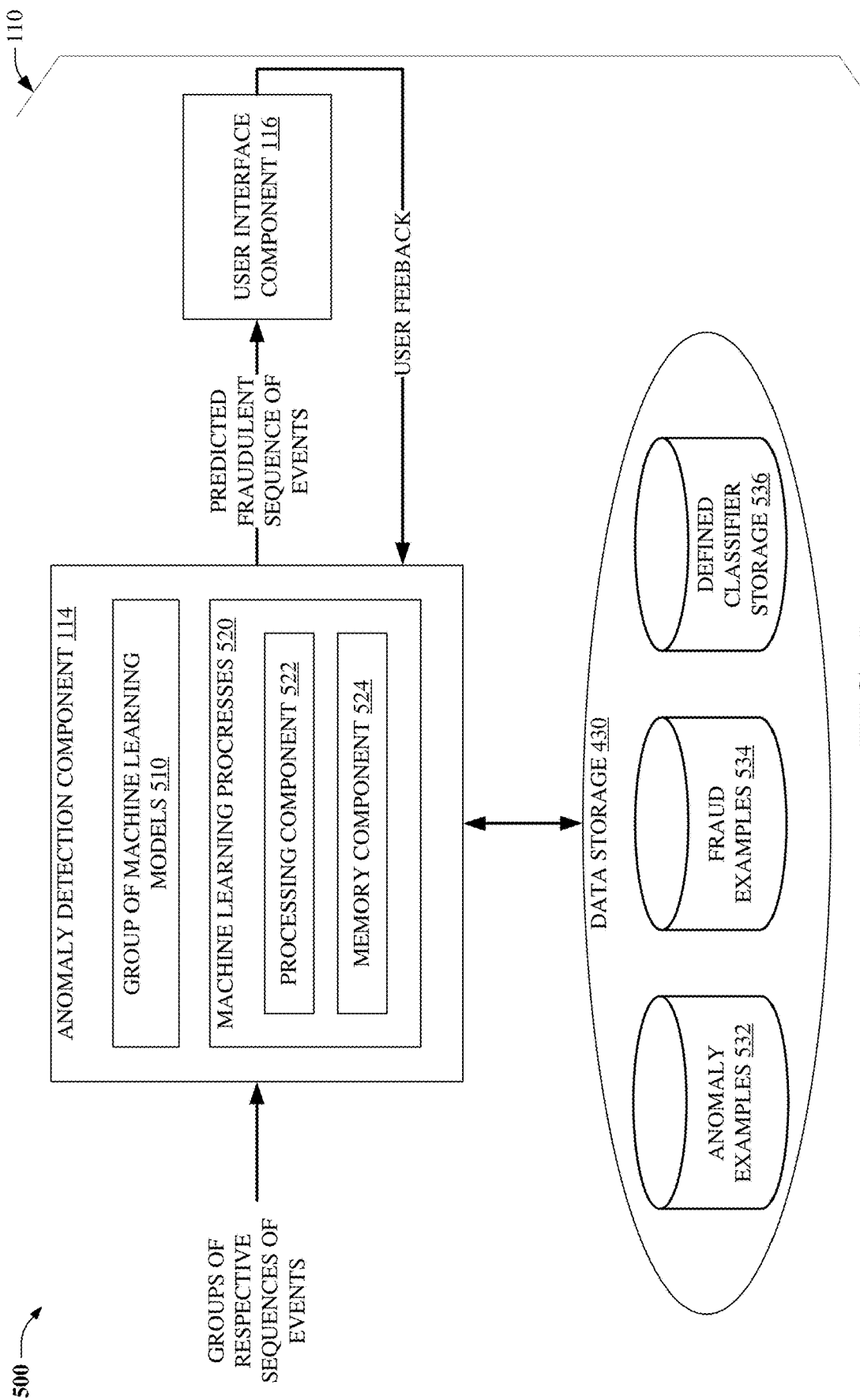
FIG. 5 illustrates a block diagram of a communication environment including an anomaly detection component of an event sequence anomaly detection system for facilitating data stream based event sequence anomaly detection for mobility customer fraud analysis, in accordance with various example embodiments.
Figure 6:
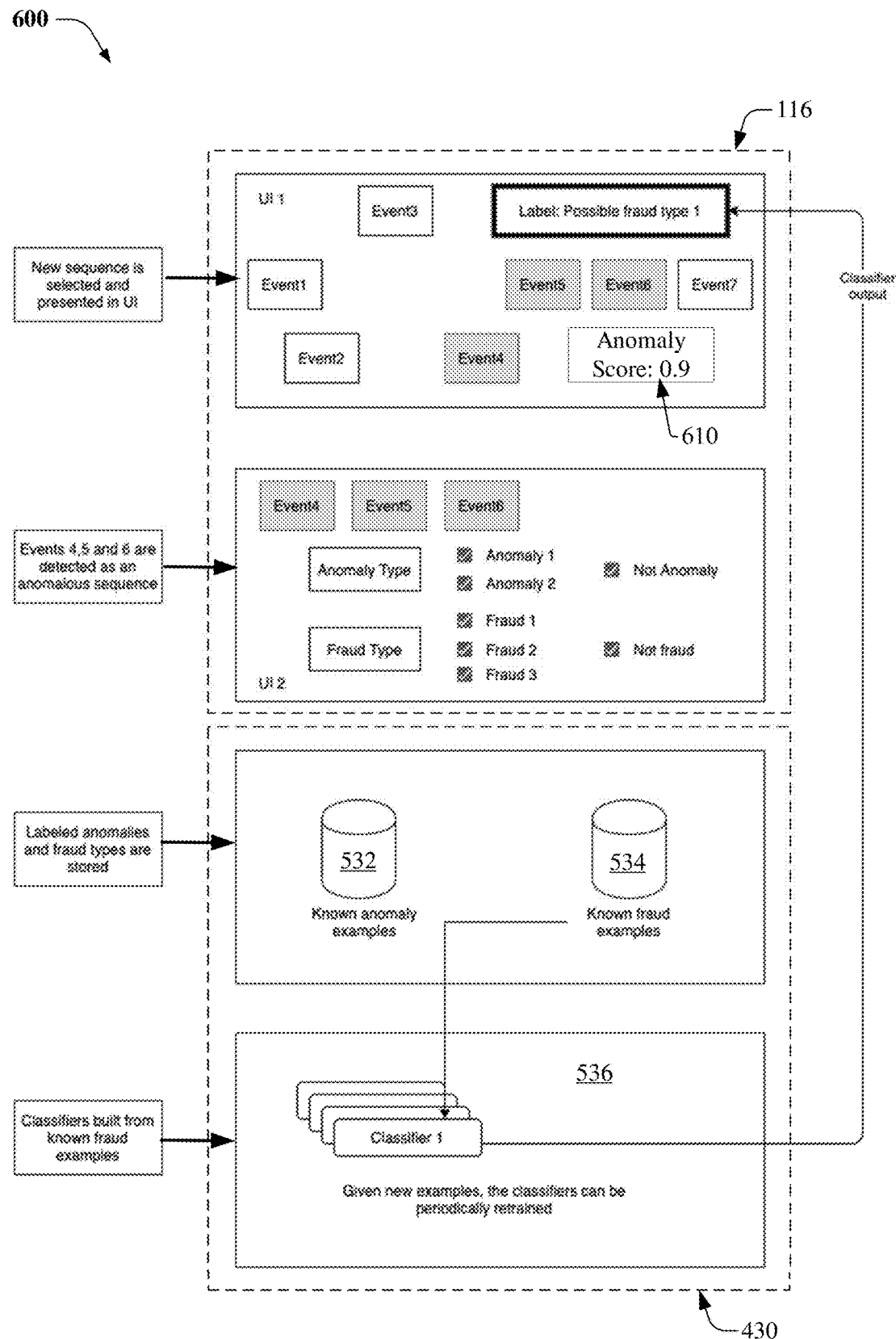
FIG. 6 illustrates a block diagram of a communication environment including a user interface component and data storage of an event sequence anomaly detection system for facilitating data stream based event sequence anomaly detection for mobility customer fraud analysis, in accordance with various example embodiments.

In this regard, and now referring to FIGS. 5 and 6, based on defined classifiers (e.g., that have been stored in a defined classifier storage (536) and that represent respective fraudulent sequences of events), the anomaly detection component can determine, via a group of machine learning models (510) corresponding to respective machine learning processes (520) (including a processing component (522) and a memory component (524)), whether the group comprising the sequence of events satisfies, e.g., based on the other contextual information, a defined condition with respect to likelihood of representing a fraudulent sequence of events of the respective fraudulent sequences of events.

In turn, in response to the sequence of events being determined to satisfy the defined condition with respect to the likelihood of representing the fraudulent sequence of events, the anomaly detection component sends, via a user interface component (116), a notification indicating that the sequence of events has been determined to represent the fraudulent sequence of events, e.g., as a predicted fraudulent sequence of events.

In embodiment(s), the anomaly detection component determines whether the sequence of events satisfies the defined condition with respect to the likelihood of representing the fraudulent sequence of events by determining, based on the respective metadata, whether the contextual information of the events is representative of a defined classifier, of the defined classifiers, which represents the fraudulent sequence of events. For example, the anomaly detection component can generate the defined classifiers from known fraud examples (534) that have been stored in data storage 530, e.g., such examples including respective sequences of events that have been labeled and/or annotated with metadata representing respective contextual information corresponding to known types of fraud.

Mobility account takeover fraud can involve a series of actions to prepare for such fraud. Such anomalous actions contain events that are "out of the ordinary," and can be indicators for fraud. However, rare events can also be considered anomalous, yet have no malicious intent. Also, an event and/or a sequence of events that seems out-of-the ordinary can represent a systematic or data quality issue. Accordingly, in embodiment(s), the anomaly detection component comprises a semi-supervised machine learning process in which known anomaly examples (532) and known fraud examples (534) that have been stored in a data store (530) can be treated as examples for training, refining, and/or generating, via the group of machine learning models, the defined classifiers based on user feedback received via the user interface component. In this regard, the user interface component facilitates active monitoring of fraud trends, identification of new fraud schemes, and receiving feedback from an analyst to enhance, modify, refine, and/or initially develop the models.

In embodiment(s), the known anomaly examples and the known fraud example including respective sequences of events that have been labeled and/or annotated with metadata representing respective contextual information corresponding to known types of anomalies or known types of fraud.

As illustrated by FIG. 6, the user interface component displays the predicted fraudulent sequence of events, e.g., "Event 4", "Event 5", and "Event 6", via a timeline to facilitate an understanding of an intent of the subscriber, facilitate a recognition, by the analyst, of a root cause of the predicted fraudulent sequence of events, and/or facilitate a distinction, by the analyst, between malicious anomalies and rare-event anomalies.

In embodiment(s), the anomaly detection component determines, via the group of machine learning models, a determined probability of an occurrence of the sequence of events, and assigns an anomaly score (610) to the sequence of events based on the determined probability—the anomaly score being selected from a number from 1.0 to 10.0, in which a lowest score of 1.0 represents a lowest defined threshold probability representing that a most uncommon sequence of events has been determined to have occurred, and in which a highest score of 10.0 represents a highest defined threshold probability representing that a most common sequence of events has been determined to have occurred. In turn, prior to the sending the of notification indicating that the sequence of events has been determined to represent the fraudulent sequence of events, the anomaly detection component confirms that the determined probability of the occurrence of the sequence of events is at most a defined threshold probability representing that the sequence of events is uncommon. In other words, the anomaly detection component confirms that the determined probability of the occurrence is less than or equal to the defined threshold probability, e.g., corresponding to a defined threshold anomaly score, e.g., 2.1.

In other embodiment(s), the sequence of events is a fraudulent sequence of events candidate, and in response to a confirmation, being received by the anomaly detection component via the user interface component, indicating that the respective fraudulent sequences of events are to comprise the fraudulent sequence of events candidate, the anomaly detection component: generates a defined classifier of the defined classifiers comprising metadata representing contextual information of the events representing contexts of the respective modalities of communication, and assigns the defined classifier to the fraudulent sequence of events candidate—representing that the respective fraudulent sequences of events comprises the fraudulent sequence of events candidate.

In embodiment(s), the sequence of events includes a triggering event and remaining events, other than the triggering event, which have occurred within a defined period of the triggering even In this regard, in an embodiment, the anomaly detection component can receive, via the user interface component, a selection of the triggering event, and obtain, from the data storage, the remaining events of the sequence of the events that have occurred within the defined period of time.

Further, the anomaly detection component displays, via the user interface component, the sequence of events via a timeline representing respective times when the events occurred, e.g., with respect to the triggering event. In one example, the triggering event includes: an on-line event representing an interaction with a communication interface corresponding to the communication service provider identity; a purchase event representing a purchase, via the communication interface and associated with a subscriber identity corresponding to a subscription service associated with the communication service provider identity, of a service; a password reset event representing a request to reset a password of an account associated with the subscriber identity; or a call event representing that a call corresponding to a mobile device associated with the subscriber identity has been initiated.

In another example, remaining events of the sequence of events, other than the triggering event, include: a messaging event representing that a short message service message has been directed to the mobile device associated with the subscriber identity, the on-line event, the purchase event, the password reset event, and/or the call event.

Figure 7:
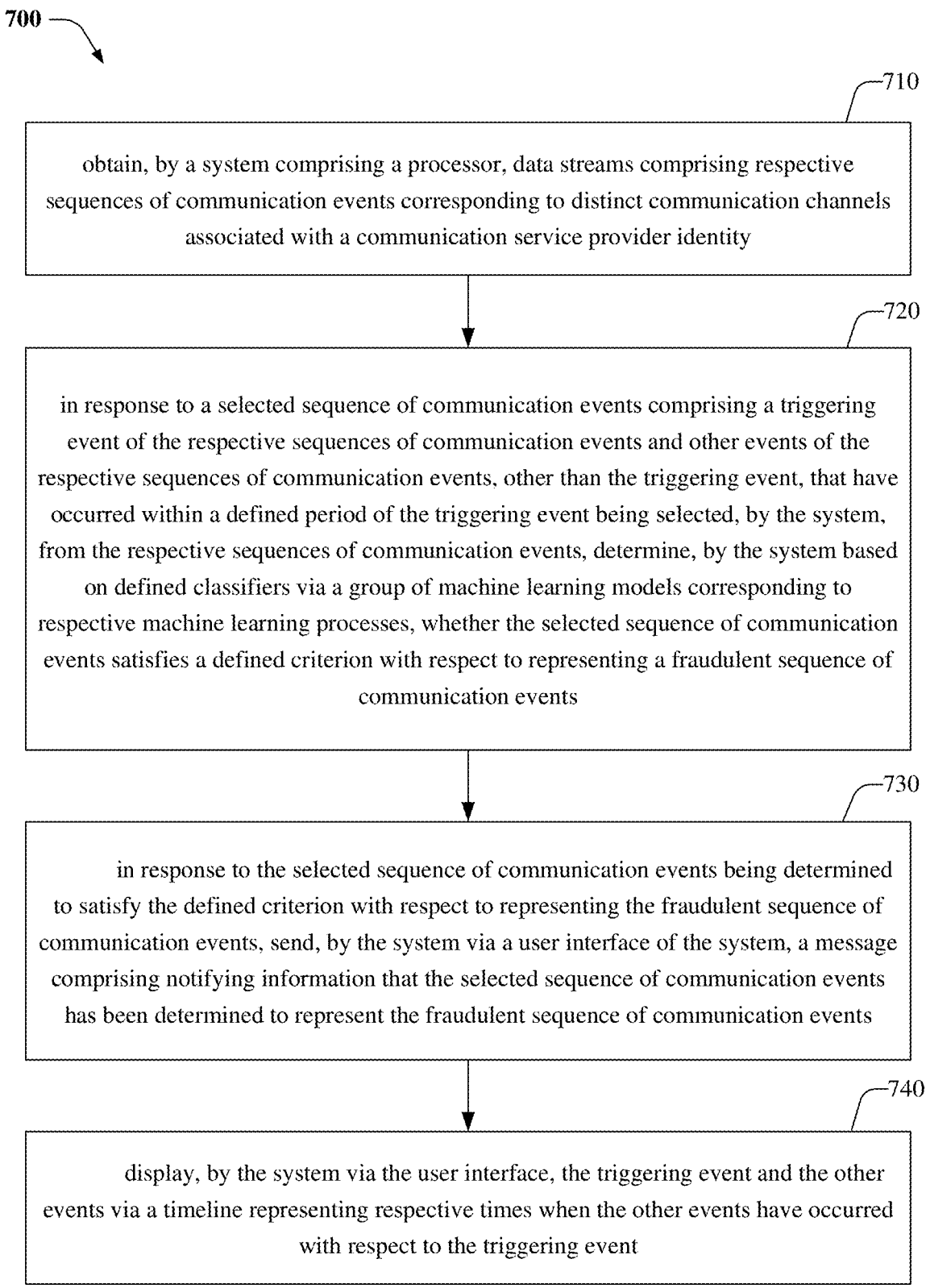
FIG. 7 illustrates a flow chart of a method associated with facilitating data stream based event sequence anomaly detection for mobility customer fraud analysis, in accordance with various example embodiments.
Figure 8:
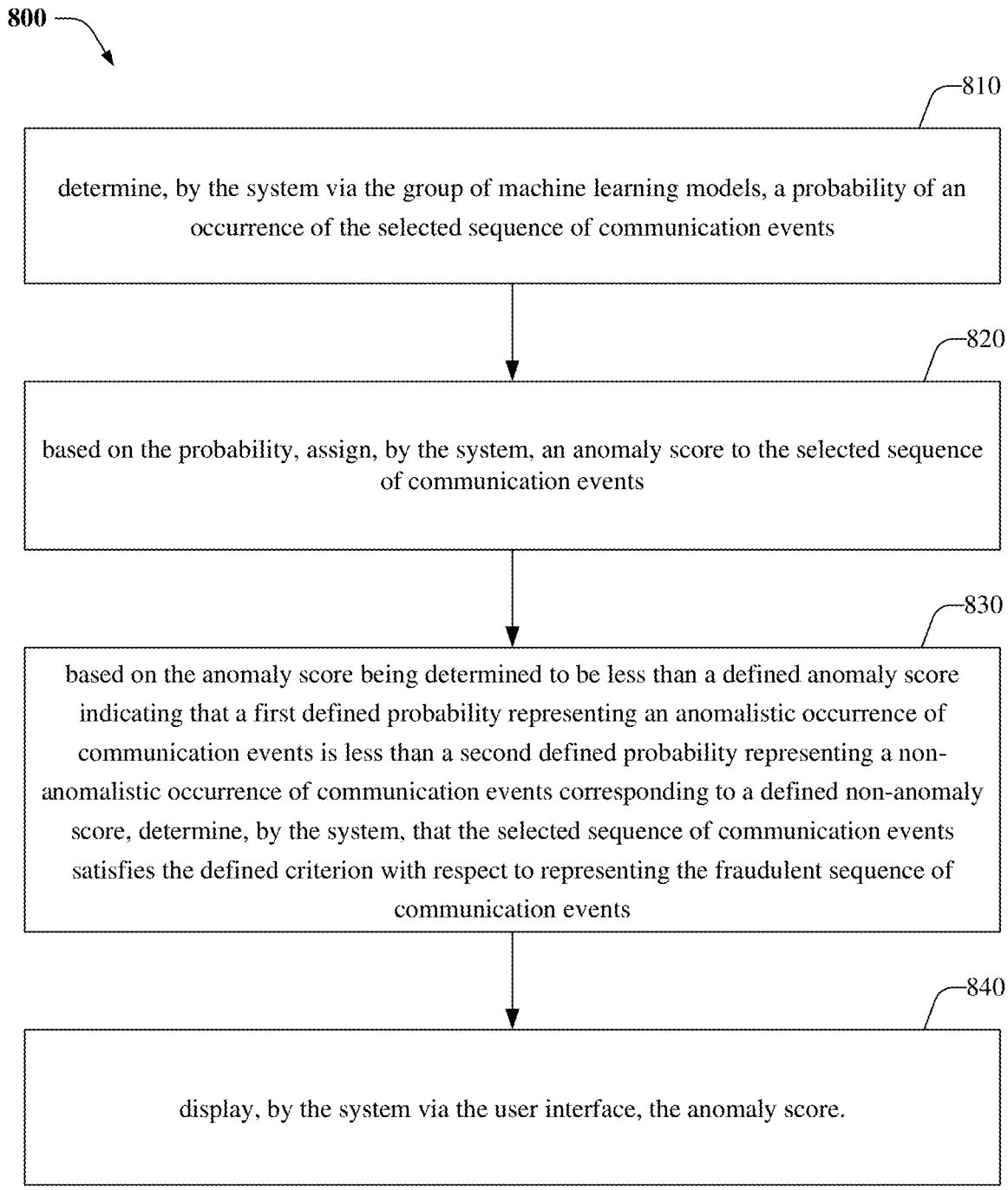
FIG. 8 illustrates a flow chart of another method associated with facilitating data stream based event sequence anomaly detection for mobility customer fraud analysis, in accordance with various example embodiments.

FIGS. 7-8 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, a flow chart (700) of a method associated with facilitating mobility customer fraud detection is illustrated, in accordance with various example embodiments. At 710, a system (e.g., 110) obtains data streams comprising respective sequences of communication events corresponding to distinct communication channels associated with a communication service provider identity.

At 720, in response to a selected sequence of communication events comprising a triggering event of the respective sequences of communication events and other events of the respective sequences of communication events, other than the triggering event, that have occurred within a defined period of the triggering event being selected, by the system, from the respective sequences of communication events, the system determines, based on defined classifiers via a group of machine learning models corresponding to respective machine learning processes, whether the selected sequence of communication events satisfies a defined criterion with respect to representing a fraudulent sequence of communication events.

At 730, in response to the selected sequence of communication events being determined to satisfy the defined criterion with respect to representing the fraudulent sequence of communication events, the system sends, via a user interface of the system, a message comprising notifying information that the selected sequence of communication events has been determined to represent the fraudulent sequence of communication events.

At 740, the system displays, the user interface, the triggering event and the other events via a timeline representing respective times when the other events have occurred with respect to the triggering event.

FIG. 8 illustrates a flow chart (800) of another method associated with facilitating mobility customer fraud detection, in accordance with various example embodiments. At 810, the system determines, via the group of machine learning models, a probability of an occurrence of the selected sequence of communication events.

At 820, the system assigns, based on the probability, an anomaly score to the selected sequence of communication events.

At 830, based on the anomaly score being determined to be less than a defined anomaly score indicating that a first defined probability representing an anomalistic occurrence of communication events is less than a second defined probability representing a non-anomalistic occurrence of communication events corresponding to a defined non-anomaly score, the system determines that the selected sequence of communication events satisfies the defined criterion with respect to representing the fraudulent sequence of communication events.

At 840, the system displays, via the user interface, the anomaly score.

Figure 9:
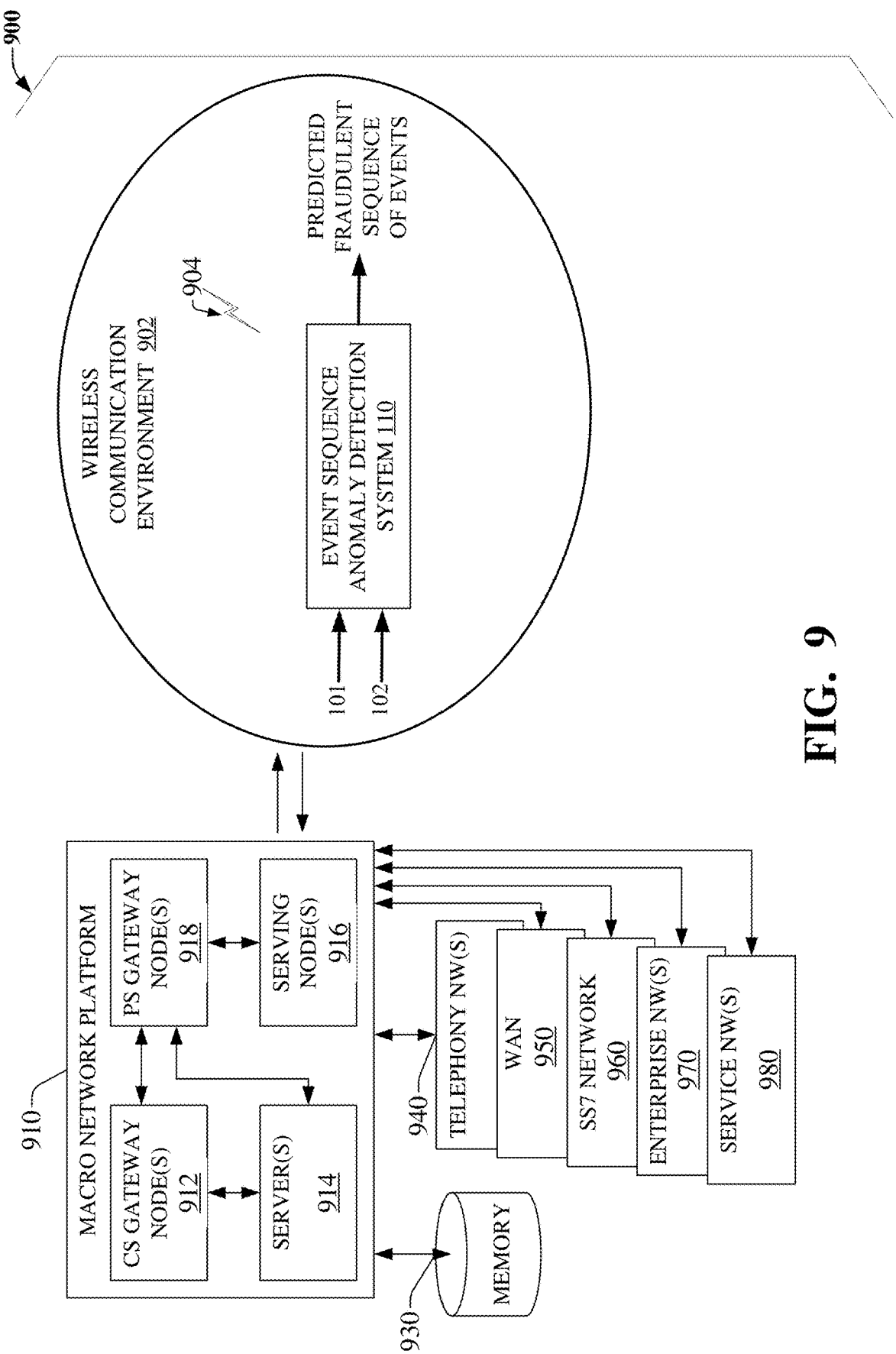
FIG. 9 illustrates a block diagram of a wireless network environment for facilitating data stream based event sequence anomaly detection for mobility customer fraud analysis, in accordance various example embodiments.

FIG. 9 illustrates communication environment 900 including macro network platform 910 and wireless communication environment 902 for facilitating data stream based event sequence anomaly detection for mobility customer fraud analysis, in accordance various example embodiments. Macro network platform 910 serves or facilitates communication with various components and devices, via wireless communication environment 902, utilizing various wireless cellular technologies, e.g., 3GPP UMTS, high speed packet access (HSPA), 3GPP LTE, third generation partnership project 2 (3GPP2), ultra-mobile broadband (UMB), LTE-A, 5G, etc. In this regard, in embodiment(s), macro network platform 910 can be embodied in a core network. It is noted that the wireless communication environment 902 can include base station(s), base transceiver station(s), access point(s), macrocells, small cell(s), and similar types of wireless communication devices, associated electronic circuitry, and deployment site(s), in addition to a wireless radio link (904) operated in accordance with the base station(s), etc. Accordingly, wireless communication environment 902 can comprise various coverage cells, or wireless coverage areas. In addition, it should be appreciated that elements and/or components of wireless communication environment 902, e.g., event sequence anomaly detection system 110, can be located/included within one or more components/elements, e.g., hardware, software, etc., of macro network platform 910, etc.

Generally, macro network platform 910 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication. In various embodiments, macro network platform 910 includes CS gateway (GW) node(s) 912 that can interface CS traffic received from legacy networks like telephony network(s) 940, e.g., public switched telephone network (PSTN), public land mobile network (PLMN), Signaling System No. 7 (SS7) network 960, etc. CS GW node(s) 912 can authorize and authenticate traffic, e.g., voice, arising from such networks. Additionally, CS GW node(s) 912 can access mobility or roaming data generated through SS7 network 960; for instance, mobility data stored in a visitor location register (VLR), which can reside in memory 930. Moreover, CS GW node(s) 912 interfaces CS-based traffic and signaling with PS GW node(s) 918. As an example, in a 3GPP UMTS network, PS GW node(s) 918 can be embodied in GW general packet radio service (GPRS) support node(s) (GGSN).

As illustrated by FIG. 9, PS GW node(s) 918 can receive and process CS-switched traffic and signaling via CS GW node(s) 912. Further PS GW node(s) 918 can authorize and authenticate PS-based data sessions, e.g., via wireless communication environment 902, with served devices, communication devices, etc. Such data sessions can include traffic exchange with networks external to macro network platform 910, like wide area network(s) (WANs) 950; enterprise networks (NWs) 970, e.g., E911, service NW(s) 980, e.g., an IP multimedia subsystem (IMS), etc. It should be appreciated that local area network(s) (LANs), which may be a part of enterprise NW(s) 970, can also be interfaced with macro network platform 910 through PS GW node(s) 918. PS GW node(s) 918 can generate packet data contexts when a data session is established, e.g., associated with an EPS bearer context activation. To that end, in an aspect, PS GW node(s) 918 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), PS GW node(s) 918 (e.g., GGSN) and tunnel interface (e.g., TTG) comprise a packet data GW (PDG).

Macro network platform 910 also includes serving node(s) 916 that can convey the various packetized flows of information, or data streams, received through PS GW node(s) 918. As an example, in a 3GPP UMTS network, serving node(s) can be embodied in serving GPRS support node(s) (SGSN).

As indicated above, server(s) 914 in macro network platform 910 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 910. Data streams can be conveyed to PS GW node(s) 918 for authorization/authentication and initiation of a data session, and to serving node(s) 916 for communication thereafter. Server(s) 914 can also affect security, e.g., implement one or more firewalls, of macro network platform 910 to ensure network's operation and data integrity in addition to authorization and authentication procedures that CS GW node(s) 912 and PS GW node(s) 918 can enact. Moreover, server(s) 914 can provision services from external network(s), e.g., WAN 950, or global positioning system (GPS) network(s), which can be a part of enterprise NW(s) 980. It is to be noted that server(s) 914 can include one or more processors configured to confer at least in part the functionality of macro network platform 910. To that end, the one or more processors can execute code instructions stored in memory 930, for example.

In wireless communication environment 900, memory 930 can store information related to operation of macro network platform 910, e.g., related to operation of a base station device, etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via wireless communication environment 902; and so forth. Memory 930 can also store information from at least one of telephony network(s) 940, WAN 950, SS7 network 960, enterprise NW(s) 970, or service NW(s) 980.

In one or more embodiments, components of wireless communication environment 900 can provide communication services to devices utilizing an over-the-air wireless link (e.g., 904) via wireless communication environment 902. In this regard, wireless communication environment 902 can include one or more: macro, Femto, or pico access points (APs) (not shown); base stations (BS); landline networks (e.g., optical landline networks, electrical landline networks) (not shown) communicatively coupled between the device and macro network platform 910, etc.

Wireless communication environment 900 can include one or more of the Internet (or another communication network (e.g., IP-based network)), or DSL-type or broadband network facilitated by Ethernet or other technology. In various embodiments, wireless communication environment 900 can include hardware and/or software for allocating resources to the devices and wireless communication environment 902, converting or enforcing protocols, establishing and/or providing levels of quality of service (QoS), providing applications or services, translating signals, and/or performing other desired functions to facilitate system interoperability and communication to/from the devices and wireless communication environment 902.

In other embodiment(s), wireless communication environment 900 can include data store component(s), a memory configured to store information, computer-readable storage media storing computer-executable instructions, e.g., memory component 524, memory 930, etc. enabling various operations to be performed, e.g., by the event sequence anomaly detection system, via wireless communication environment 902 as described herein.

As it employed in the subject specification, the term "processor", "processing component", or other terms referencing a processing device can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

In the subject specification, terms such as "memory component", "memory", "memory storage", "system memory", "data storage", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory component 524, memory 930, system memory 1006 (see below), external storage 1016 (see below), and/or memory storage 1052 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1012) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
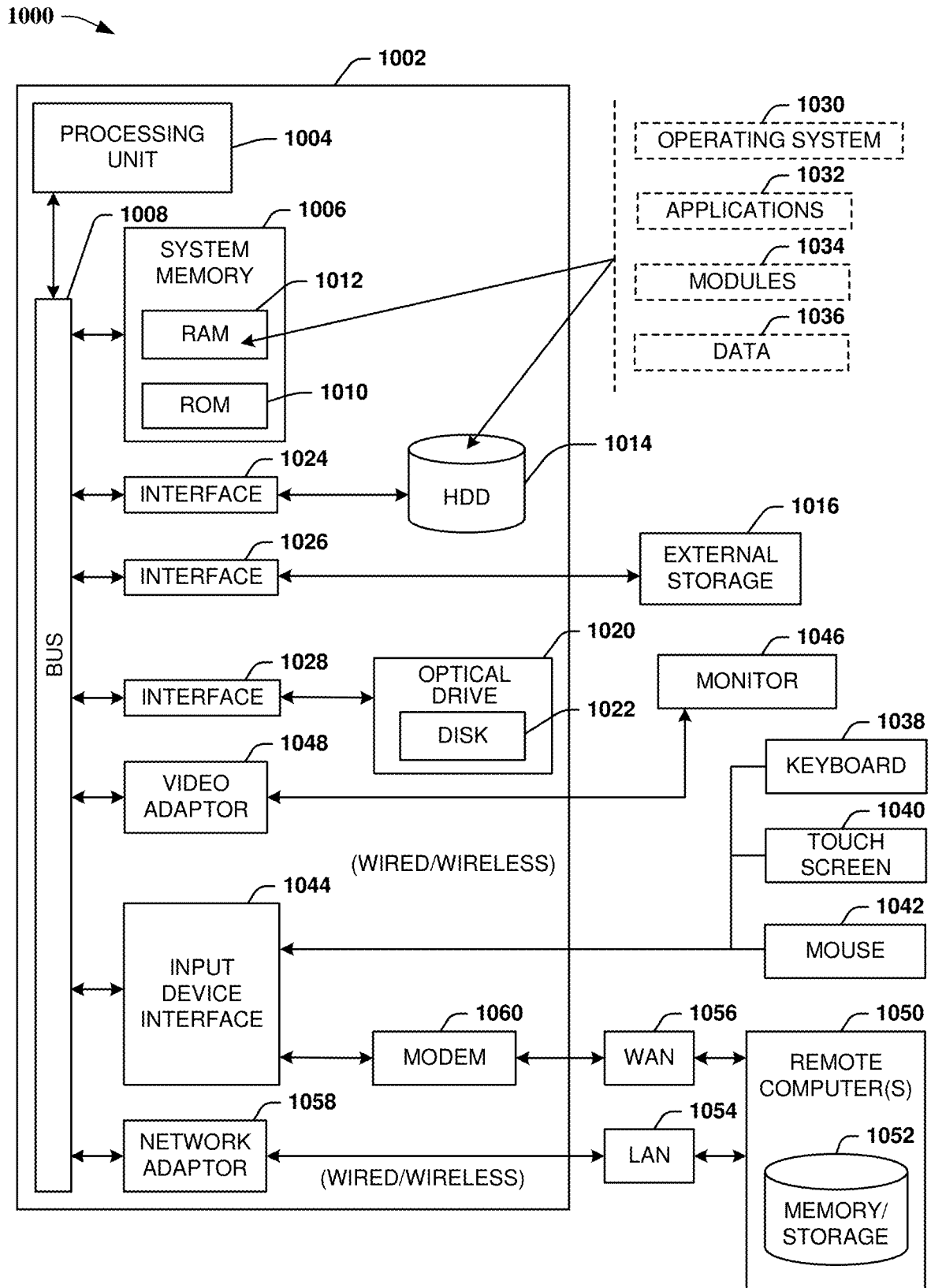
FIG. 10 is a block diagram representing an illustrative non-limiting computing system or operating environment in which one or more aspects of various embodiments described herein can be implemented for facilitating data stream based event sequence anomaly detection for mobility customer fraud analysis, in accordance various example embodiments.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that in various embodiments, methods disclosed herein can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication environment, e.g., 900, for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless device, e.g., a wireless communication device, a user equipment, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., 110), including, but not limited to, determining, via a group of machine learning models corresponding to respective machine learning processes, whether sequence of events satisfy a defined condition with respect to likelihood of representing a fraudulent sequence of events of the respective fraudulent sequences of events as disclosed herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., a decision tree based learning model, a linear regression based learning model, support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations by the processor, comprising:
obtaining a sequence of events comprising respective modalities of communication that correspond to a subscriber identity associated with a communication service, wherein the sequence of events has occurred within a defined period;
based on defined classifiers representing respective fraudulent sequences of events, determining, via a group of machine learning models corresponding to respective machine learning processes, whether the sequence of events satisfies a defined condition with respect to likelihood of representing a fraudulent sequence of events of the respective fraudulent sequences of events; and
in response to the sequence of events being determined to satisfy the defined condition with respect to the likelihood of representing the fraudulent sequence of events, sending, via a user interface of the system, a notification indicating that the sequence of events has been determined to represent the fraudulent sequence of events, wherein the events of the sequence of events have been annotated with respective metadata representing contextual information of the events of the sequence of events, and wherein the contextual information represents respective contexts of the respective modalities of communication.

2. The system of claim 1, wherein the sequence of events comprises a triggering event, and wherein sending the notification comprises:
  displaying, via the user interface, the sequence of events via a timeline representing respective times when the events occurred with respect to the triggering event.

3. The system of claim 2, wherein the triggering event comprises a purchase, associated with the subscriber identity via a sales-channel communication interface corresponding to a communication service provider identity associated with the communication service, of a product, and wherein remaining events of the sequence of events precede the triggering event.

4. The system of claim 1, wherein a context of the respective contexts of a modality of communication of the respective modalities of communication comprises:
  a defined phone number,
  a defined area code of the phone number,
  a defined toll-free phone number,
  a defined spoofed phone number,
  a relationship of a first event of the sequence of events that occurred within the defined period to a second event of the sequence of events that occurred within the defined period,
  a temporary password corresponding to a subscriber account associated with the subscriber identity,
  a temporary personal identification number corresponding to the account associated with the subscriber identity, or
  respective times that the events of the sequence of events occurred.

5. The system of claim 1, wherein determining whether the sequence of events satisfies the defined condition with respect to the likelihood of representing the fraudulent sequence of events comprises:
  based on the respective metadata, determining whether the contextual information of the events is representative of a defined classifier, of the defined classifiers, representing the fraudulent sequence of events.

6. The system of claim 1, wherein the respective modalities of communication comprise at least one of
  an Internet-based communication,
  a call corresponding to a phone number of a communication device associated with the subscriber identity,
  a short message service message that has been directed to the communication device associated with the subscriber identity, or
  a sales-channel communication interface corresponding to a communication service provider that enables the communication service.

7. The system of claim 6, wherein an event of the sequence of events comprises:
  an on-line event representing an interaction with the sales-channel communication interface corresponding to the communication service provider,
  a purchase event representing a purchase, associated with the subscriber identity via the sales-channel communication interface corresponding to the communication service provider, of at least one of a product or a service,
  a password reset event representing a request to reset a password of an account associated with the subscriber identity, or
  a call event representing that the call has been initiated.

8. The system of claim 1, wherein the operations further comprise:
  assigning an anomaly score to the sequence of events representing a determined probability of an occurrence of the sequence of events, wherein the defined condition corresponds to a defined threshold probability representing that the sequence of events is uncommon; and
  prior to sending the notification, confirming that the determined probability of the occurrence of the sequence of events is at most the defined threshold probability.

9. The system of claim 1, wherein the sequence of events is a fraudulent sequence of events candidate, and wherein the operations further comprise:
  in response to receiving, via the user interface, a confirmation that the respective fraudulent sequences of events are to comprise the fraudulent sequence of events candidate,
    generating a defined classifier of the defined classifiers comprising the respective metadata representing the contextual information of the events, of the sequence of events, and
    assigning the defined classifier to the fraudulent sequence of events candidate, wherein assigning the defined classifier indicates that the respective fraudulent sequences of events comprise the fraudulent sequence of events candidate.

10. The system of claim 1, wherein the group of machine learning models comprises at least one of a supervised machine learning model, an unsupervised machine learning model, a semi-supervised machine learning model, a deterministic rule-based machine learning model, a probabilistic-based machine learning model, or a deep learning model.

11. A method, comprising:
  obtaining, by a system comprising a processor, data streams comprising respective sequences of communication events corresponding to distinct communication channels associated with a communication service provider identity;
  in response to selecting, by the system from the respective sequences of communication events, a selected sequence of communication events comprising a triggering event of the respective sequences of communication events and other events of the respective sequences of communication events, other than the triggering event, that have occurred within a defined period of the triggering event, determining, by the system based on defined classifiers via a group of machine learning models corresponding to respective machine learning processes, whether the selected sequence of communication events satisfies a defined criterion with respect to representing a fraudulent sequence of communication events;
  in response to the selected sequence of communication events being determined to satisfy the defined criterion with respect to representing the fraudulent sequence of communication events, sending, by the system via a user interface of the system, a message comprising notifying information that the selected sequence of communication events has been determined to represent the fraudulent sequence of communication events; and
  annotating, by the system, the respective sequences of communication events with metadata representing contexts of the distinct communication channels, wherein the contexts comprise at least one of
    a defined phone number,
    a defined area code of the phone number,
    a defined toll-free phone number,
    a defined spoofed phone number, a relationship of a first event, of the respective sequences of communication events that have occurred within the defined period, to a second event of the respective sequences of communication events, a temporary password corresponding to an account associated with a subscriber identity, a temporary personal identification number corresponding to the account associated with the subscriber identity, or respective times that the communication events of the respective sequences of communication events occurred.

12. The method of claim 11, wherein the triggering event comprises:

an on-line event representing an interaction with a communication interface corresponding to the communication service provider identity, a purchase event representing a purchase, via the communication interface and associated with a subscriber identity corresponding to a subscription service associated with the communication service provider identity, of a service, a password reset event representing a request to reset a password of an account associated with the subscriber identity, or a call event representing that a call corresponding to a mobile device associated with the subscriber identity has been initiated.

13. The method of claim 12, wherein the other events comprise at least one of:

a messaging event representing that a short message service message has been directed to the mobile device associated with the subscriber identity, the on-line event, the purchase event, the password reset event, or the call event.

14. The method of claim 11, further comprising:

displaying, by the system via the user interface, the triggering event and the other events via a timeline representing respective times when the other events have occurred with respect to the triggering event.

15. The method of claim 11, wherein determining whether the selected sequence of communication events satisfies the defined criterion comprises:

determining, via the group of machine learning models, a probability of an occurrence of the selected sequence of communication events;

based on the probability, assigning an anomaly score to the selected sequence of communication events; and based on the anomaly score being determined to be less than a defined anomaly score indicating that a first defined probability representing an anomalistic occurrence of communication events is less than a second defined probability representing a non-anomalistic occurrence of communication events corresponding to a defined non-anomaly score, determining that the selected sequence of communication events satisfies the defined criterion with respect to representing the fraudulent sequence of communication events, wherein sending the message further comprises displaying, via the user interface, the anomaly score.

16. The method of claim 11, wherein selecting the selected sequence of communication events comprises:

receiving a selection of the triggering event; and based on the selection of the triggering event and the defined period, obtaining, via the group of machine learning models, the other events of the respective sequences of communication events.

17. The method of claim 16, wherein receiving the selection comprises:

determining, via the group of machine learning models, the selection of the triggering event, or receiving, via the user interface, the selection of the triggering event, wherein the selection has been selected from a group of selectable triggering events comprising an on-line event representing an interaction with a communication interface corresponding to the communication service provider identity, a purchase event representing a purchase, via the communication interface and associated with a subscriber identity corresponding to the communication service provider identity, of at least one of a product or a service, a password reset event representing a request to reset a password of an account associated with the subscriber identity, a call event representing that a call corresponding to a mobile device associated with the subscriber identity has been initiated, or a messaging event representing that a short message service message has been directed to the mobile device associated with the subscriber identity.

18. A non-transitory machine-readable medium, comprising executable instructions that, when executed by a system comprising a processor, facilitate performance of operations, comprising:

in response to obtaining, from data streams, respective sequences of communication events corresponding to communication channels and based on defined classifiers via a group of machine learning models corresponding to respective machine learning processes, determining whether a sequence of communication events of the respective sequences of communication events satisfies a defined condition representative of the sequence of communication events being a fraudulent sequence of communication events candidate, wherein the fraudulent sequence of communication events comprises a triggering event of the sequence of communication events and remaining events of the sequence of communication events that have occurred within a defined period from the triggering event;

in response to determining that the sequence of communication events satisfies the defined condition representative of the sequence of communication events being the fraudulent sequence of communication events candidate, sending, via a user interface of the system, a notification representative of the sequence of communication events having been determined to be the fraudulent sequence of communication events candidate; and in response to receiving, via the user interface of the system, a confirmation that the respective sequences of communication events are to comprise the fraudulent sequence of communication events candidate, generating a defined classifier that comprises metadata representing contextual information of the communication events of the sequence of communication events, wherein the contextual information represents contexts of respective modalities of communication, and assigning the defined classifier to the fraudulent sequence of communication events candidate, wherein assigning the defined classifier indicates that the respective sequences of communication events comprise the fraudulent sequence of communication events candidate.

19. The non-transitory machine-readable medium of claim 18, wherein sending the notification comprises:
displaying, based on the defined period via the user interface, the triggering event and the remaining events via a timeline representing respective times corresponding to when the remaining events occurred with respect to the triggering event.

20. The non-transitory machine-readable medium of claim 18, wherein the contexts comprise at least one of:
a defined phone number,
a defined area code of the phone number,
a defined toll-free phone number,
a defined spoofed phone number,
a relationship of a first event, of the sequence of communication events that have occurred within the defined period, to a second event of the sequence of communication events,
a temporary password corresponding to an account associated with a subscriber identity,
a temporary personal identification number corresponding to the account associated with the subscriber identity, or
respective times that the communication events of the sequence of communication events occurred.

\* \* \* \* \*